United States Patent [19]

Scott

[11] Patent Number: 5,434,932
[45] Date of Patent: Jul. 18, 1995

[54] LINE ALIGNMENT APPARATUS AND PROCESS

[75] Inventor: Donald D. Scott, St. Paul, Minn.

[73] Assignee: West Publishing Company, Eagan, Minn.

[21] Appl. No.: 281,825

[22] Filed: Jul. 28, 1994

[51] Int. Cl.6 .......................... G06K 9/03; G06K 9/68; G06K 9/72; G06K 9/00

[52] U.S. Cl. .................................. 382/309; 382/227; 382/229; 382/318

[58] Field of Search ........................ 382/57, 38, 40, 62

[56] References Cited

U.S. PATENT DOCUMENTS

| | | | |
|---|---|---|---|
| 3,568,156 | 3/1971 | Thompson | 340/172.5 |
| 3,988,715 | 10/1976 | Mullan et al. | 382/40 |
| 4,010,445 | 3/1977 | Hoshino | 382/57 |
| 4,032,887 | 6/1977 | Roberts | 382/62 |
| 4,315,246 | 2/1982 | Milford | 382/57 |
| 4,418,423 | 11/1983 | Tsuji et al. | 382/57 |
| 4,493,051 | 1/1985 | Brezzo et al. | 364/900 |
| 4,631,666 | 12/1986 | Harris et al. | 364/200 |
| 4,907,283 | 3/1990 | Tanaka et al. | 382/57 |
| 4,974,260 | 11/1990 | Rudak | 382/57 |
| 5,097,263 | 3/1992 | Delpech et al. | 341/155 |
| 5,151,971 | 9/1992 | Jousselin et al. | 395/2 |
| 5,257,323 | 10/1993 | Melen et al. | 382/57 |
| 5,274,832 | 12/1993 | Khan | 395/800 |
| 5,295,198 | 3/1994 | Maney | 382/38 |
| 5,315,668 | 5/1994 | O'Hair | 382/57 |

OTHER PUBLICATIONS

John C. Handley, et al., "Merging Optical Character Recognition Outputs for Improved Accuracy," RIAO 91 Conference, Barcelona, Spain, pp. 160-174, Apr. 2, 1991.

Roger B. Bradford, "Technical Factors in the Creation of Large Full-text Databases," DOE Infotech 91 Conference, Oakridge, Tenn., May 23, 1991, (six pages).

Lois A. Dickey, "Operational Factors in the Creation of Large Full-Text Databases," DOE Infotech 91 Conference, Oakridge, Tenn., May 22, 1991 (six pages).

Roger B. Bradford, et al., "Error Correlation in Contemporary OCR Systems," ICDAR 91 Conference, St. Malo, France, pp. 516, 519, 520, 522 and 524, Sep. 30, 1991.

Stephen V. Rice, et al., "A Report on the Accuracy of OCR Devices," Technical Report, Information Science Research Institute, University of Nevada (Las Vegas), pp. 1-6, Mar. 4, 1992.

T. A. Nartker, et al., "A Preliminary Report on OCR Problems in LSS Document Conversion," Nuclear Waste Management Conference, Las Vegas, Nev. Apr. 1992 (five pages).

Steven V. Rice, et al., "A Difference Algorithm for OCR-Generated Text," Proceedings of IAPR Workshop on Syntatic & Structural Pattern Recognition, Bern, Switzerland, pp. 1-9, Aug. 26, 1992.

Primary Examiner—Leo H. Boudreau
Assistant Examiner—Anh Hong Do
Attorney, Agent, or Firm—Kinney & Lange

[57] ABSTRACT

A computer implemented process of matching two lines of text produced by optical character readers analyzes words in the two lines to identify matching words in corresponding positions in the two lines. Lines are then identified as matching based on the number of matching words in corresponding positions.

24 Claims, 4 Drawing Sheets

Fig. 3

|  | MY | dog | has | fleas |
|---|---|---|---|---|
| MY | YES | NO | NO | NO |
| dog | NO | NO | YES | NO |
| has | NO | NO | NO | NO |
| fleas | NO | NO | NO | YES |

Fig. 4

|  | The | quick | brown | fox | has | fleas |
|---|---|---|---|---|---|---|
| brown | NO | NO | YES | NO | NO | NO |
| fox | NO | NO | NO | YES | NO | NO |
| has | NO | NO | NO | NO | YES | NO |
| fleas | NO | NO | NO | NO | NO | YES |

Fig. 5

| | The | quick | brown | fox | has | fleas |
|---|---|---|---|---|---|---|
| The | YES | NO | NO | NO | NO | NO |
| fleas | NO | NO | NO | NO | NO | YES |
| has | NO | NO | NO | NO | YES | NO |
| quick | NO | YES | NO | NO | NO | NO |
| brown | NO | NO | YES | NO | NO | NO |
| fox | NO | NO | NO | YES | NO | NO |

LINE ALIGNMENT APPARATUS AND PROCESS

BACKGROUND OF THE INVENTION

This invention relates to optical character recognition systems and, more particularly, to line matching processes for such systems.

Optical character recognition (OCR) devices from different manufacturers often differ in their ability to recognize particular characters. It is common in some OCR applications to use multiple OCR devices to process digital images of scanned documents and then merge the results. If an individual OCR device misreads a character, the merging process, or voting process, will disregard that character identification and choose a character identified by a plurality of the other OCR devices or a character identified by an OCR device that has a known propensity to recognize that character. The voting process typically produces a more accurate result that that produced by any single OCR device. The voting process requires that the text files created by the OCR devices be line and character aligned. If the text files are not line and character aligned, the voting process usually is inoperative.

The line aligning process is a determination of whether lines of text between a plurality of text files are matching. One common technique for line matching employs the Hickey-Handley algorithm described in "Merging Optical Character Recognition Outputs for Improved Accuracy," by John C. Handley and Thomas B. Hickey, RIAO 91 Conference. This algorithm computes a string edit distance between lines of the text files under comparison. A string edit distance is the minimum number of insertions, deletions, and substitutions required to transform one line into the other. A record is kept of the string edit distances between a line of a first text file and all of the lines of a second text file. The string edit distances are then compared to identify matching lines. Matching lines are those that yield the minimum string edit distance.

The Hickey-Handley algorithm is also commonly used for character aligning files. Using this algorithm, characters contained in matching lines are positioned within those lines such that the alignment yields a minimum string edit distance.

After the text files are line and character aligned, a voting process compares matching lines on a character by character basis. Predetermined voting rules are utilizing to select characters for output.

Previous line aligning processes, such as the Hickey-Handley algorithm, are computationally intensive and, therefore, require a considerable amount of processing time. If numerous files must be line aligned using these processes, efficiency is greatly impacted. The present invention is a process for line aligning that is less computationally intensive and more efficient than previous processes.

SUMMARY OF THE INVENTION

In accordance with the present invention, words from line are compared to words in matching positions from another line to identify matching words. Matching lines are identified based on the number of matching words in matching positions.

Preferably, a truth table is used to facilitate comparison of the words. Each line of text is represented by an axis on the truth table. The truth table contains entries indicating whether individual words along one axis match individual words along a second axis. A threshold is established which represents the number of proportion of matching words that is required for the lines to be matching. At least one diagonal of the truth table is identified. If the number of matches along the diagonal exceeds the threshold, the lines are deemed to be matching. If the truth table is square, i.e., the number of words along each axis is the same, the diagonal that is identified is the one that includes the first words of both lines. If the truth table is nonsymmetrical, two diagonals are identified. The first includes the first words of both lines, the second includes the last words of both lines. If there are a sufficient number of matches along either diagonal to exceed the threshold, the lines are deemed to be matching.

Preferably, each word in the lines being compared is represented by a token which is made up of at least one value. The tokens are then compared to determine if the words are matching.

In one preferred embodiment, the threshold is a predetermined fraction of the number of words along the axis having the most words. In another form of the invention, the threshold is a predetermined number.

BRIEF DESCRIPTION OF THE DRAWINGS

FIG. 3 is a square truth table illustrating the process of the present invention.

FIG. 4 is a non-symmetrical truth table illustrating the process of the present invention.

FIG. 5 is a square truth table illustrating the process of the present invention.

DETAILED DESCRIPTION OF THE PREFERRED EMBODIMENTS

Figure 1:
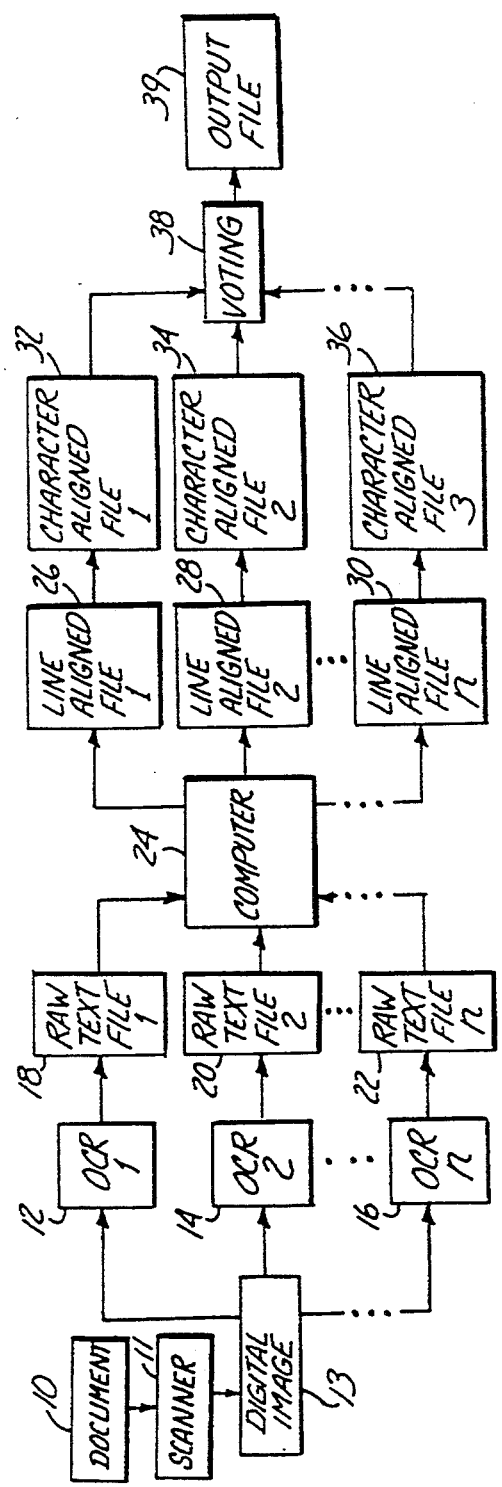
FIG. 1 is a block diagram of a text aligning apparatus and process according to the present invention.

FIG. 1 is a block diagram illustrating the process of merging a plurality of raw text files into a single output file in accordance with the presently preferred embodiment of the present invention. Scanner 11 scans document 10 to produce digital image file 13. In the present invention, the term "file" refers to information stored in any electronically-accessible form including, but not limited to, information stored in a hard disk system, a floppy disk system, an optical storage system, or random access memory. The digital image file is analyzed by a plurality of OCR devices 12, 14, and 16 to identify the characters contained in the image. Characters recognized by the OCR devices are output to raw text files 18, 20, and 22. The raw text files are then processed by computer 24 which is programmed to perform various functions including line aligning, character aligning, and voting. A plurality of OCR devices are utilized, rather than a single OCR device, to improve the accuracy of character recognition. It is known that different OCR devices utilize different algorithms for character recognition resulting in each OCR device having differing abilities to recognize various characters. Hence, OCR devices 12, 14, and 16 are different and are chosen to complement each other to provide more accurate outputs for specific characters than could be achieved by any single OCR device. OCR devices 12, 14, and 16 may be any hardware and software combination that has the capability to read in digital images, identify characters contained in the images, and store the characters in a raw text file. Suitable OCR devices include Caere OmniPage Professional, Expervision TypeReader, Xerox TextBridge, Calera Millenium MM600, and Calera WordScan Plus.

The line aligning process of the present invention converts raw text files 18, 20, and 22 to line aligned files 26, 28, and 30. The character aligning process converts the line aligned files to character aligned files 32, 34, and 36. Finally, voting process 38 selects characters from character aligned files 32, 34, and 36 for inclusion in output file 39.

Figure 2:
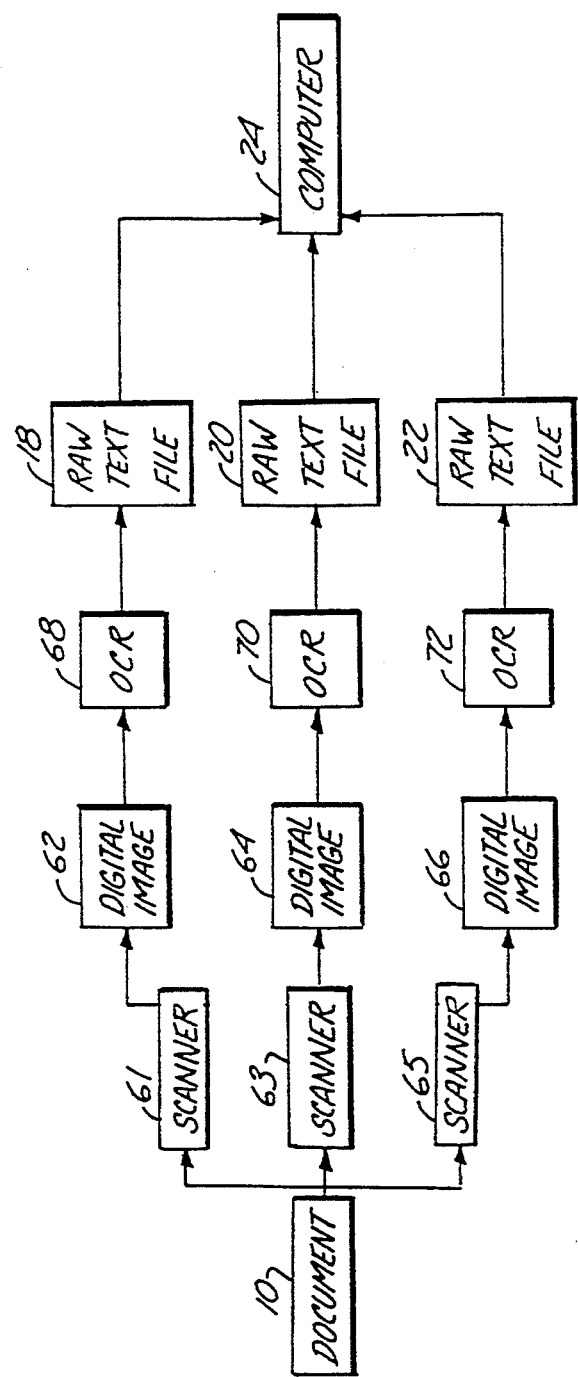
FIG. 2 is a block diagram of a modification of a text aligning apparatus and process according to the present invention.

Preferably, a single scanner 11 scans document 10 to produce a single digital image file 13 which is processes by the plural OCR devices. Optionally, scanning may be performed by scanners 61, 63, and 65 to produce plural digital image files 62, 64, and 66 as shown in FIG. 2. In this case, each OCR 12, 14, and 16 analyzes a different digital image file of document 10, rather than the one digital image file being analyzed by each OCR as shown in FIG. 1.

The raw text files are line aligned by comparing one line of one raw text file to one line of another raw text file, and identifying if the two lines are matching. The two lines need not be equivalent to each other to be a match, they need only be sufficiently similar to satisfy a predetermined accuracy threshold. The lines of at least one raw text file are compared to the lines of at least one other raw text file and a record is kept of the matching lines. Lines are removed if they are found only in one text file with no corresponding lines in the other text files. If a line is found in some text files but not in others, a copy of that line may be inserted to the files that do not contain that line. In such a case, the line is copied from a text file produced by the OCR device having the highest recognition accuracy rate. This minimizes the possibility of a line containing a misread word being copied to another file which would perpetuate a recognition error. After the lines have been compared and the matching lines have been identified, line aligned files 26, 28, and 30 are created to store the matching lines. The matching lines are output to the line aligned files such that each set of matching lines appears on the same line number.

Previously, line aligning was accomplished by use of the Hickey-Handley algorithm. The Hickey-Handley algorithm employed calculation of the string edit distance between two strings of characters. The string edit distance is the minimum number of insertions, deletions, and substitutions required to transform one string into the other. The string edit distance was calculated between one line of one raw text file and each line of a second raw text file. Matching lines were those that yielded the minimum string edit distance.

The present invention aligns lines by identifying matches in text files along prime diagonals of truth tables. A value of token is assigned to each word in the lines being compared. One method of assigning a value to a word is to represent the word by the difference between the ASCII values of the first and the last characters of the word. For example, the ASCII values for the letters "d", "o", and "g" are 100, 111, and 103 respectively. Hence, the difference technique for "dog" results in a value of 3 (103−100). A second method is to represent a word by the sum of the ASCII values of each letter in the word. The summation technique for "dog" results in a value of 314 (100 +111+103). Other methods may also be utilized. A greater degree of accuracy can be achieved through use of tokens containing plural values. For example, the subtraction method for the word "dog" and the misread word "dog" both result in a value of 3 (103−100), whereas the summation method results in a value of 314 for "dog" and 302 for "dog" (100+99+103). For this reason, it is preferred to represent each word with a token representing plural values, for example, 3.314 for "dog" and 3.302 for "dog". Table I sets forth the ASCII values for lower case Roman letters.

TABLE I

| Character | ASCII Value |
|---|---|
| a | 97 |
| b | 98 |
| c | 99 |
| d | 100 |
| e | 101 |
| f | 102 |
| g | 103 |
| h | 104 |
| i | 105 |
| j | 106 |
| k | 107 |
| l | 108 |
| m | 109 |
| n | 110 |
| o | 111 |
| p | 112 |
| q | 113 |
| r | 114 |
| s | 115 |
| t | 116 |
| u | 117 |
| v | 118 |
| w | 119 |
| x | 120 |
| y | 121 |
| z | 122 |

After each word in the lines being compared has been assigned a value or token, a truth table 40 like that represented in FIG. 3 is created based on lines from at least two raw text files. It should be understood that the truth table is manifest in electronic form in computer 24 to perform matching functions herein described, and may not be a physical table as shown in FIG. 3. Hence, FIG. 3 illustrates a truth table for sake of explanation only. Moreover, while the invention is described in conjunction with matching lines from two raw text files using a two-dimensional table, lines from three or more text files may be matched simultaneously using a three-dimensional or more table. It is preferred, however, that lines from only two text files be matched during an iteration of the process.

Table 40 illustrates how to identify if two lines of text are matching. A line of text from each of two text files is placed along each axis of the table. The values of tokens assigned to the words along one axis are compared to the values or tokens assigned to the words along the second axis. For a square truth table as in FIG. 3, a prime diagonal 42 is identified embracing the positions along diagonal 42 from upper left to lower right. Hence, diagonal 42 embraces the first word on each axis, second word on each axis, etc., through the last word on each axis. The number of words along an axis is counted, as is the number of matching words along prime diagonal 42. If the number of matching words along diagonal 42 exceeds a predetermined threshold, the lines are deemed to be matching. Preferably, the threshold is some predetermined fraction of the number of words along an axis, so in the example of FIG. 3, if the threshold is 0.60, the lines are deemed matching because 3 out of 4 or 0.75 of the words match.

In practice, the number of words in a line will usually exceed four, but that number is used here for sake of simplicity of explanation. Lines containing 20 to 30 words are not uncommon. Moreover, thresholds would ordinarily be established to permit no more than two or three mismatching words in a given line, so thresholds of 0.85 to 0.95 would not be uncommon. Further, although truth table 40 is shown containing actual words, the truth table preferably operates on the basis of assigned values or tokens based on ASCII codes. Words are shown solely for simplicity of explanation.

FIG. 4 illustrates a non-symmetrical truth table 46 having six words along the horizontal axis and four words along the vertical axis. A first prime diagonal 48 is identified that includes the first word of both axes as shown at the upper left corner of the table. The number of matching words along diagonal 48 is identified and tested to the threshold values to establish whether the lines along the axes are matching. The threshold and matching process is as described in connection with FIG. 3. If a match is found along diagonal 48, the lines are output to the respective line aligned files 26, 28 and 30. If no matching is found along diagonal 48, the process is repeated along a second prime diagonal 50 that includes the last word along each axis. In the example illustrated in FIG. 4, there are no matches along prime diagonal 48, but there are four matches along prime diagonal 50. The threshold is selected on the basis of a predetermined fraction of the number of words along one axis, as in FIG. 3, but with the modification that the axis selected is the axis with the greater number of words. There are six words in the line of text containing the greater number of words. Thus, the matching proportion along diagonal 50 is 4/6 or 0.667. If the established threshold is 0.60, then, these are matching lines.

The example illustrated in FIG. 5 is a square truth table in which the words of both lines are the same but the other is different. Matches along a prime diagonal ensure that the order of the words is correct. Here, only one match along prime diagonal 52 exists, where six words appear along an axis. This equates to a matching proportion of 0.167. These lines are not deemed to be matching because the matching proportion does not equal or exceed the predetermined threshold (e.g., 0.60).

As described above, a record of all the matching lines is kept. A line is removed if it is found only in one text file with no corresponding line in the other text files. If a line is found in some text files but not in others, a copy of that line may be inserted to the files that do not contain that line. More particularly, if a line is found by a majority of OCR devices (where three or more such devices are employed), the line is copied from the file having the highest recognition accuracy rate to the proper position in the files missing the line. The matching lines are output to line aligned files 26, 28, and 30 such that each set of matching lines appears on the same line number. The line aligned files are then character aligned as at 32, 34, and 36. A preferable approach to character aligning is the Hickey-Handley algorithm, although other techniques may be used.

When character aligning two lines with the Hickey-Handley algorithm, the characters of one line are aligned with the characters of the other line such that the alignment yields a minimum string edit distance. The character aligned lines are output to character aligned files 32, 34, and 36, which are processed through a voting process.

One typical voting process is described in "Technical Factors in the Creation of Large Full-Text Databases," by Roger B. Bradford, DOE Infotech 91 Conference. Voting is performed by comparing ASCII streams of line and character aligned files 32, 34, and 36. The streams are compared on a character-by-character basis. Where all files agree on the identity of a character, that character is output to output file 39. Where there is disagreement between characters in files 32, 34 and 36, a voting algorithm is utilized to determine a character for output so that a character appearing in a majority of files 32, 34, and 36 is selected for output. Typically, the voting algorithm uses a plurality voting rule to determine a character for output. However, certain OCR devices recognize certain characters more accurately than other OCR devices. If characters appear in the data stream of an OCR device that is known to accurately recognize such characters, those characters may be included in the output file by default.

The present invention is simple and requires fewer computations than previous line aligning processes. Processing time is thus reduced which correspondingly increases the rate at which documents can be scanned and stored in text files.

Although the present invention has been described with reference to preferred embodiments, workers skilled in the art will recognize that changes may be made in form and detail without departing from the spirit and scope of the invention.

What is claimed is:

1. A computer-implemented process of comparing a line of text produced by reading a digital image of a document by a first reader to a line of text produced by reading a digital image of the same document by a second reader, each of the lines of text having a plurality of words, the process comprising:
   identifying the positions of words in the line of text produced by the first reader and in the line of text produced by the second reader;
   analyzing the words in the line of text produced by the first reader and in the line of text produced by the second reader to identify matching words in corresponding positions in the lines of text produced by the first and second readers; and
   outputting the line of text produced by the first reader to a first line-aligned file and output the line of text produced by the second reader to a second line-aligned file if the number of matching words in corresponding positions exceeds a predetermined threshold.

2. The process of claim 1 wherein the step of identifying is performed by forming a truth table having a first axis representing words of a selected line of text in a first raw text file and a second axis representing words of a selected line of text in a second raw text file, and the step of analyzing is performed by inserting entries on the table indicating that individual words along the first axis match individual words along the second axis.

3. The process of claim 2 including;
   establishing the threshold based on the number of words along at least one of the axes; and
   identifying a diagonal of the truth table having a number of entries indicating matches that exceeds the threshold.

4. The process of claim 3 wherein the threshold is established by counting the number of words along the first and second axes and selecting a threshold as a predetermined fraction of the number of words along the axis having the most words.

5. The process of claim 3 wherein the step of identifying a diagonal comprises:
   determining whether the number of words along the first and second axes are equal;
   if the number of words along the first and second axes are equal so that the truth table forms a single prime diagonal, determining whether the number of entries indicating matches in the prime diagonal exceeds the threshold; and
   if the number of words along the first and second axes are unequal so that the truth table forms plural prime diagonals, selecting a first prime diagonal having an initial position containing the first word of the line of text produced by the first reader and the first word of the line of text produced by the second reader and determining whether the number of entries indicating matches in the first prime diagonal exceeds the threshold.

6. The process of claim 5 wherein if the number of words along the first and second axes are unequal so that the truth table forms plural prime diagonals and the first prime diagonal does not contain a number of entries indicating matches exceeding the threshold, selecting a second prime diagonal having a last position containing the last word of the line of text produced by the first reader and the last word of the line of text produced by the second reader, and determining whether the number of entries indicating matches in the second prime diagonal exceeds the threshold.

7. The process of claim 2 wherein forming the truth table comprises converting each word of the lines of text produced by the first and second readers into a corresponding token that represents the respective word in the truth table.

8. The process of claim 7 wherein each token comprises first and second values.

9. The process of claim 8 wherein the first value is based on the difference between the ASCII values of a first and a last character of the respective word and the second value is based on the sum of ASCII values of all characters of the respective word.

10. The process of claim 2 including:
    establishing the threshold based on the number of words along at least one of the axes; and
    identifying a diagonal of the truth table having a number of entries indicating matches that exceeds the threshold.

11. The process of claim 1 wherein a digital image of the document is read by at least three readers to produce corresponding raw text files, the process producing at least three line-aligned files, each line-aligned file corresponding to a raw text file, the process further including:
    identifying a line of matching text appearing in a majority of raw text files and not in all raw text files; and
    copying an identified line of text from one of the majority of raw text files into those line-aligned files corresponding to raw text files that did not contain the identified line of text.

12. A computer-implemented process of comparing a line of text produced by reading a digital image of a document by a first reader to a line of text produced by reading a digital image of the same document by a second reader, each of the lines of text having a plurality of words, the process comprising:
    forming a truth table having a first axis representing words of the line of text produced by the first reader, a second axis representing words of the line of text produced by the second reader, and entries indicating that individual words along the first axis match individual words along the second axis;
    establishing a threshold;
    identifying a diagonal of the truth table;
    calculating a matching proportion for the diagonal by dividing the number of entries along the diagonal by the number of words along an axis;
    comparing the matching proportion to the threshold; and outputting the lines of text to separate line-aligned files if the matching proportion exceeds the threshold.

13. The process of claim 12 wherein the matching proportion is calculated by dividing the number of entries along the diagonal by the number of words along the axis containing the greater number of words.

14. The process of claim 12 wherein a digital image of the document is read by at least three readers to produce corresponding raw text files, the process producing at least three line-aligned files, each line-aligned file corresponding to a raw text file, the process further including:
    identifying a line of matching text appearing in a majority of raw text files and not in all raw text files; and
    copying an identified line of text from one of the majority of raw text files into those line-aligned files corresponding to raw text files that did not contain the identified line of text.

15. A computer-implemented process of forming a computer-readable file of text comprising:
    reading a digital image of a document by each of a plurality of readers to produce a corresponding plurality of raw text files, each raw text file containing lines of text;
    line-aligning at least one raw text file to at least one other raw text file to produce a corresponding plurality of line-aligned files, wherein line-aligning comprises:
        identifying the positions of words in the lines of text contained in the raw text files being line-aligned;
        analyzing the words in the lines of text contained in the raw text files being line-aligned to identify matching words in corresponding positions;
        identifying matching lines of text based on the number of matching words in corresponding positions; and
        producing a plurality of line-aligned files containing the matching lines of text produced by the plurality of readers;
    character-aligning the line-aligned files to produce a corresponding plurality of line-aligned, character-aligned files;
    comparing the characters of the plurality of line-aligned, character-aligned files; and
    selecting a probable character from the plurality of line-aligned, character-aligned files for each character position in the computer-readable file of text.

16. The process of claim 15 wherein the step of identifying the positions of words in the lines of text is performed by forming a truth table having a first axis representing words of a selected line of text in a first raw text file and a second axis representing words of a selected line of text in a second raw text file, and the step of analyzing is performed by inserting entries indicating that individual words along the first axis match individual words along the second axis.

17. The process of claim 16 wherein the step of matching comprises:

establishing a threshold based on the number of words along at least one of the axes; and identifying a diagonal of the truth table having a number of matches that exceeds the threshold.

18. The process of claim 17 wherein the threshold is established by counting the number of words along the first and second axes and selecting a threshold as a predetermined fraction of the number of words along the axis having the most words.

19. The process of claim 17 wherein the step of identifying a diagonal comprises:

determining whether the number of words along the first and second axes are equal;

if the number of words along the first and second axes are equal so that the truth table forms a single prime diagonal, determining whether the number of entries indicating matches in the prime diagonal exceeds the threshold; and if the number of words along the first and second axes are unequal so that the truth table forms plural prime diagonals, selecting a first prime diagonal having an initial position containing the first word of the selected line of text in the second raw text file, and determining whether the number of entries indicating matches in the first prime diagonal exceeds the threshold.

20. The process of claim 19 wherein if the number of words along the first and second axes are unequal so that the truth table forms plural prime diagonals and the first prime diagonal does not contain a number of entries indicating matches exceeding the threshold, selecting a second prime diagonal having a last position containing the last word of the selected line of text in the first raw text file and the last word of the selected line of text in the second raw text file, and determining whether the number of entries indicating matches in the second prime diagonal exceeds the threshold.

21. The process of claim 16 wherein forming the truth table comprises converting each word of each of the selected lines of text in the first and second raw text files into a corresponding token that represents the respective word in the truth table.

22. The process of claim 21 wherein each token comprises first and second integers.

23. The process of claim 22 wherein the first integer is based on the difference between the ASCII values of a first and a last character of the respective word and the second integer is based on the sum of ASCII values of all characters of the respective word.

24. The process of claim 15 wherein a digital image of the document is read by at least three readers to produce corresponding raw text files, the process producing at least three line-aligned files, each file-aligned file corresponding to a raw text file, the process further including:

identifying a line of matching text appearing in a majority of raw text files and not in all raw text files; and copying an identified line of text from one of the majority of raw text files into those line-aligned files corresponding to raw text files that did not contain the identified line of text.

* * * * *